United States Patent [19]

Divish et al.

[11] 4,325,158

[45] Apr. 20, 1982

[54] SPATULA SCRAPER ATTACHMENT FOR COOKING GRILLE

[76] Inventors: Dale J. Divish, M.M.M. Sonesta St. L101, Umatilla, Oreg. 87882; Harvey W. Driggs, 990 W. Juniper, Apt. #33, Hermiston, Oreg. 97838

[21] Appl. No.: 211,058

[22] Filed: Nov. 28, 1980

[51] Int. Cl.³ .............................................. A47L 17/00
[52] U.S. Cl. .................................. 15/236 R; 15/218.1
[58] Field of Search ...................... 15/236, 237, 218.1

[56] References Cited

U.S. PATENT DOCUMENTS

| | | | |
|---|---|---|---|
| 287,242 | 10/1883 | Collins | 15/237 |
| 400,019 | 3/1889 | Tyler | 15/237 |
| 1,132,646 | 3/1915 | Bauman | 15/237 |
| 2,839,772 | 6/1958 | Lambert | 15/236 R |
| 2,861,288 | 11/1958 | Steindorf | 15/236 R |
| 3,094,730 | 6/1963 | Schwarz | 15/218.1 |
| 3,307,212 | 3/1967 | MacInnes | 15/236 X |
| 3,372,419 | 3/1968 | Howey | 15/218.1 X |
| 3,396,421 | 8/1968 | Rade | 15/236 R |

*Primary Examiner*—Robert L. Bleutge

*Attorney, Agent, or Firm*—Harvey B. Jacobson

[57] ABSTRACT

An adjustable width inverted channel member is provided including depending inner and outer longitudinal flanges interconnected along their upper longitudinal marginal edge portions by a bight portion extending and secured therebetween. The channel member is positionable over the front transverse curb of a cooking grille with the opposing inner surfaces of the flanges opposing the front and rear sides of the curb and the latter frictionally gripped between the flanges. The inner longitudinal side of the channel member includes an upwardly extending longitudinal scraping flange projecting upwardly above the bight portion and extending therealong. The scraping flange includes an upper edge having a horizontally straight portion over which the under and upper surfaces of a spatula may be frictionally scraped in order to scrape food clinging to the spatula therefrom. Also, the upper edge of the scraping flange includes a portion thereof having an upwardly opening transverse notch formed therein in which the marginal edges of a spatula may be scraped.

6 Claims, 6 Drawing Figures

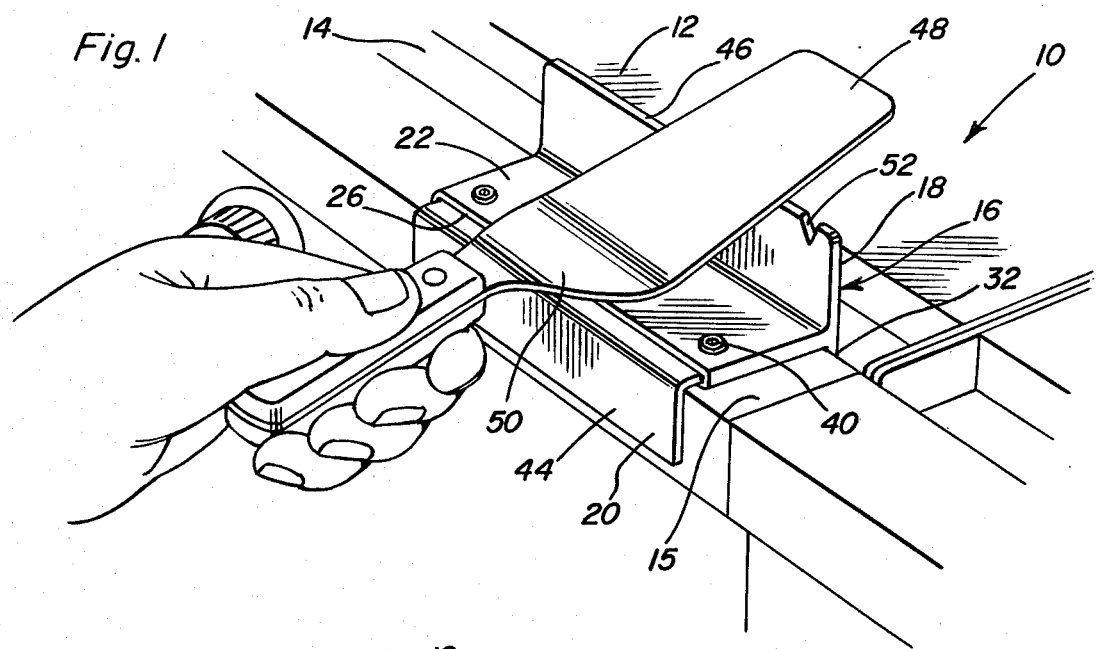
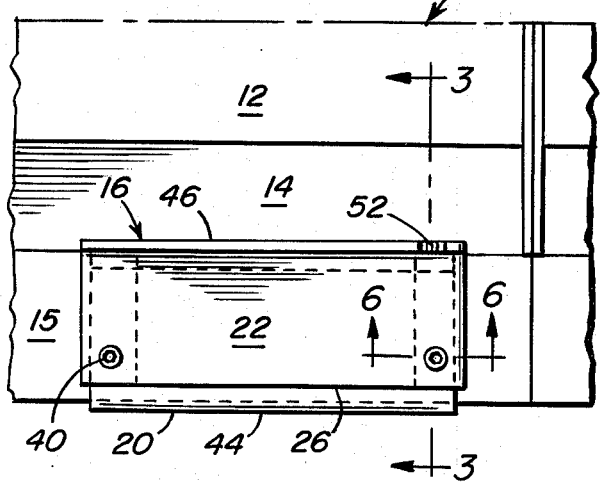

SPATULA SCRAPER ATTACHMENT FOR COOKING GRILLE

BACKGROUND OF THE INVENTION

In restaurants and fast food establishments where heated imperforate grille plates are used for cooking purposes the grille plates occasionally are scraped with a cooking spatula to remove food which clings to the plate. In addition, food being cooked on the plate and handled by a spatula may cling to the upper, under and edge surfaces of the spatula. When the grille plate is scraped with a spatula or food being cooked on the grille clings to the spatula, the under, upper and edge surfaces thereof must be scraped clean of food in order to enable proper operation of the spatula. Although various forms of spatula scraping device heretofore have been provided, most require two hand usage or are not operative in an efficient manner to perform the necessary spatula scraping operation in a minimum of time. Accordingly, a need exists for an improved form of spatula scraper.

Examples of previously known forms of spatula scrapers and cleaners including some of the general structural and operational features of the instant invention are disclosed in U.S. Pat. Nos. 287,242, 400,019, 1,132,646, 2,839,772, 2,861,288 and 3,372,419.

BRIEF DESCRIPTION OF THE INVENTION

The spatula scraper attachment of the instant invention comprises an adjustable width inverted channel member for disposition over and frictionally gripping the front transverse curb of a cooking grille and the channel member includes an upwardly projecting scraping flange having a horizontally straight surface over which the under and upper surfaces of a spatula may be scraped in order to remove food clinging to the spatula. In addition, the upper edge of the scraping flange includes a portion thereof having an upwardly opening notch formed therein of generally V-shaped cross section and in which marginal edge portions of a cooking spatula may be scraped.

The channel member may be clamped in the desired position on the front curb of an associated cooking grille and disposed at the right hand side of the cooking grille if the user of the grille is right-handed. On the other hand, if the user of the grille is left-handed, the channel member may be quickly shifted to the left hand side of the grille. In this manner, either a right- or left-handed person may quickly scrape the upper and lower surfaces of a spatula as well as the marginal edge portions thereof in a matter of two or three seconds and the time expended by the user of the spatula in order to clean the same in a fast food establishment is maintained at a minimum.

The main object of this invention is to provide an attachment for a cooking grille which may be conveniently utilized to scrape the lower and upper surfaces as well as the marginal edges of a spatula.

Still another object of this invention is to provide a spatula attachment for a cooking grille which may be conveniently shifted from one side of the grille to the other for accommodating both right- and left-handed grille operators.

A further important object of this invention is to provide a spatula scraper constructed in a manner whereby it may be suited for attachment to various different cooking grilles including a forward transverse curb.

Another object of this invention is to provide a spatula scraper which may be conveniently used with a minimum amount of effort and through the utilization of a minimum amount of time.

A final object of this invention to be specifically enumerated herein is to provide a spatula scraper in accordance with the preceding and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESRIPTION OF THE DRAWINGS

FIG. 1 is a perspective view of the spatula scraper as attached to the front curb of a cooking grille plate and with the scraper in use for scraping the under surface of an associated spatula;

FIG. 2 is a fragmentary top plan view of the assemblage illustrated in FIG. 1 with the spatula removed and on somewhat of a reduced scale;

FIG. 3 is an enlarged fragmentary vertical sectional view taken substantially upon the plane indicated by the section line 3—3 of FIG. 2;

FIG. 4 is a perspective view similar to FIG. 1 and illustrating the manner in which a longitudinal side edge of an associated spatula may be scraped clean of food;

FIG. 5 is a bottom plan view of the spatula scraper; and

FIG. 6 is an enlarged fragmentary vertical sectional view taken substantially upon the plane indicated by the section line 6—6 of FIG. 2.

DETAILED DESCRIPTION OF THE INVENTION

Referring now more specifically to the drawings, the numeral 10 generally designates a conventional form of cooking grille including a planar imperforate cooking plate 12 heated from beneath. The forward marginal edge of the cooking plate 12 includes a drain channel 14 defining a forward transverse curb 15 forwardly of the drain channel 14.

The spatula scraper of the instant invention is referred to in general by the reference numeral 16 and includes first and second components 18 and 20. The first component 18 includes a horizontal flange 22 having first and second longitudinal marginal edge portions 24 and 26. The first component 18 additionally includes an upstanding flange 28 along whose horizontal center the longitudinal marginal edge portion 24 of the flange 22 is secured in any convenient manner. Accordingly, the upper portion 30 of the flange 28 projects above the flange 22 and the lower portion 32 of the flange 28 projects below the flange 22.

In addition, the opposite longitudinal ends of the flange 22 include downwardly offset reversely turned flanges 34, see FIG. 6, suitably apertured as at 36 and the opposite ends of the flange 22 are provided with threaded bores 38 therethrough registered with the apertures 36 and having setscrews 40 threadedly engaged therein. The downwardly offset flanges 34 together form a channel 41 in which to receive a horizontal flange component 42 of the second component 20, the latter including a vertical flange component 44 formed integrally with and depending downwardly from one longitudinal marginal edge of the horizontal flange component 42.

The longitudinal marginal portion of the horizontal flange component 42 remote from the vertical flange component 44 is laterally telescoped into the channel 41 defined between the flanges 34 and the flange 22 and is secured in adjusted telescoped position therein through the utilization of the setscrews 40. The lower portion 32 of the flange 28 and the vertical flange component 40 of the second component 20 define depending flange portions of an inverted channel-shaped assembly including a variable width bight portion extending therebetween defined by the relatively and adjustably telescoped portions of the flange 22 and the horizontal flange component 42. Thus, the channel-shaped assembly is variable in width and the opposing surfaces of the vertical flange component 44 and the lower portion 32 of the flange 38 embracingly receive the curb 15 therebetween and may frictionally grip the opposing side edges of the curb 15 in order to stationarily support the scraper attachment 16 in position on the curb 15.

The upper portion 30 of the flange 28 includes a horizontally straight upper edge portion 46 across which the under and upper surfaces of the blade portion 48 of a spatula 50 may be scraped in order to clean the blade portion 48. In addition, one end of the upper edge of the flange 28 includes a portion thereof including an upwardly opening V-shaped notch 52 formed therein in which the longitudinal side edges 54 of the blade portion 48 may be engaged for cleaning.

In operation, the scraper attachment 16 may be secured to either end of the curb 15, as desired. If the person using the cooking grille plate 12 is right-handed, the scraping attachment 16 will be disposed on the right-hand end of the curb 15. On the other hand, if the person using the cooking plate 12 is left-handed, the scraping attachment 16 will be mounted on the left-hand end of the curb 15.

Of course, the width of the channel-shaped assembly defined between the flange 28 and the vertical flange component 44 may be adjusted according to the width of the curb 15 upon which the scraper attachment is to be mounted. Also, it will be noted that the scrapings from the spatula blade portion 48 will fall downwardly along the inner side of the flange 28 and thus directly into the channel 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A spatula scraper attachment for a cooking grille, said attachment including an adjustable width inverted channel member including depending inner and outer side longitudinal flanges interconnected along their upper longitudinal marginal edge portions by a bight portion extending and secured therebetween, said channel members being positionable over the front transverse curb of a cooking grille with the opposing inner surfaces of said flanges opposing the front and rear sides of said curb and the latter frictionally gripped between said flanges, the inner longitudinal side of said channel member including an upwardly extending longitudinal scraping flange projecting upwardly above said bight portion and extending therealong, said scraping flange including an upper edge having a horizontally straight portion over which the under and upper surfaces of a spatula may be frictionally scraped in order to scrape food clinging to the spatula therefrom.

2. The scraper attachment of claim 1 wherein said scraping flange upper edge includes a portion thereof having an upwardly opening transverse notch formed therein.

3. The scraper attachment of claim 2 wherein said transverse notch is V-shaped in cross section.

4. The scraper attachment of claim 1 wherein said bight portion includes laterally telescopingly engaged opposite side longitudinal marginal portions and means operative to releasably retain said telescopingly engaged portions in adjusted telescoped positions.

5. The scraper attachment of claim 4 wherein said scraping flange upper edge includes a portion thereof having an upwardly opening transverse notch formed therein.

6. The scraper attachment of claim 5 wherein said means operative to releasably retain said telescopingly engaged portions in adjusted telescoped positions include setscrews supported from one of the telescopingly engaged portions and abuttingly engaged with the other telescopingly engaged portion.

* * * * *